United States Patent
Zhang

(10) Patent No.: US 11,370,892 B2
(45) Date of Patent: Jun. 28, 2022

(54) PFA MATERIAL AND PREPARATION METHOD THEREOF

(71) Applicant: TCL China Star Optoelectronics Technology Co., Ltd., Shenzhen (CN)

(72) Inventor: Xia Zhang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 235 days.

(21) Appl. No.: 16/626,539

(22) PCT Filed: Nov. 13, 2019

(86) PCT No.: PCT/CN2019/117788
§ 371 (c)(1),
(2) Date: Dec. 25, 2019

(87) PCT Pub. No.: WO2021/042545
PCT Pub. Date: Mar. 11, 2021

(65) Prior Publication Data
US 2021/0277195 A1  Sep. 9, 2021

(30) Foreign Application Priority Data

Sep. 4, 2019  (CN) .......................... 201910832629.5

(51) Int. Cl.
*C08J 5/18* (2006.01)
*C08K 3/38* (2006.01)

(52) U.S. Cl.
CPC ............. *C08J 5/18* (2013.01); *C08J 2333/08* (2013.01); *C08J 2383/04* (2013.01); *C08K 2003/382* (2013.01); *C08K 2201/011* (2013.01)

(58) Field of Classification Search
CPC ...... C08J 5/18; C08J 2333/08; C08J 2383/04; C08K 2003/382; C08K 2201/011

USPC .......................................................... 428/447
See application file for complete search history.

(56) References Cited

FOREIGN PATENT DOCUMENTS

| CN | 107434944 | 12/2017 |
|----|-----------|---------|
| CN | 108287451 | 7/2018  |

OTHER PUBLICATIONS

Translation of CN 109575739, Apr. 5, 2019. (Year: 2019).*
Notification of Office Action and Search Report dated Jun. 30, 2020 From the State Intellectual Property Office of the People's Republic of China Re. Application No. 201910832629.5 (18 Pages).
Li et al. "Synthesis and Property of Water-Soluble Hyperbranched Photosensitive Polysiloxane Urethane Acrylate", Industrial & Engineering Chemistry Research, 52(6): 2220-2227, Published Online Jan. 23, 2013.
Zhang et al. "Carrier Driven Gyroscope", National Defense Industry Press, Chinese Edition, p. 252-254, Nov. 1, 2015 & English Abstract.
Zhou "Silicone Materials", Leather Chemicals. Fine Chemical Series, Chinese Edition, p. 1-591, Oct. 1999. & English Abstract. Part I.
Zhou "Silicone Materials", Leather Chemicals. Fine Chemical Series, Chinese Edition, p. 1-591, Oct. 1999. & English Abstract. Part II.

* cited by examiner

*Primary Examiner* — Hui H Chin

(57) ABSTRACT

The present invention provides a polymer film on array (PFA) material and a preparation method thereof. The PFA material includes a polymer film on array (PFA) resin, a polysiloxane resin dispersion liquid, and a solvent, wherein the PFA resin ranges from 1 to 25% by weight relative to a total weight of the PFA material, and the polysiloxane resin dispersion liquid ranges from 1 to 30% by weight relative to a total weight of the PFA material.

12 Claims, 2 Drawing Sheets

| Positive photoresist | | Negative photoresist | |
|---|---|---|---|
| name | component (wt%) | name | component (wt%) |
| polysiloxane resin dispersion liquid | 1-30 | polysiloxane resin dispersion liquid | 1-30 |
| resin | 1-25 | resin | 1-25 |
| BN nanoparticle dispersion liquid | 0.1-5 | BN nanoparticle dispersion liquid | 0.1-5 |
| - | - | unsaturated polyfunctional monomer | 1-20 |
| photoinitiator | 0.05-10 | photoinitiator | 0.05-8 |
| additive | 0.01-5 | additive | 0.01-5 |
| solvent | - | solvent | - |

PFA MATERIAL AND PREPARATION METHOD THEREOF

RELATED APPLICATIONS

This application is a National Phase of PCT Patent Application No. PCT/CN2019/117788 having International filing date of Nov. 13, 2019, which claims the benefit of priority of Chinese Provisional Patent Application No. 201910832629.5 filed on Sep. 4, 2019. The contents of the above applications are all incorporated by reference as if fully set forth herein in their entirety.

FIELD AND BACKGROUND OF THE INVENTION

The invention relates to the technical field of composite materials, in particular to a polymer film on array (PFA) material and a preparation method thereof.

In the manufacturing process of a thin film transistor liquid crystal display (TFT-LCD), since the substrate is continuously moved, rubbed, adsorbed, heated, pressurized, separated, desorbed, and cooled, etc., static electricity is continuously generated, and when it accumulates to a certain extent, an electrostatic discharge (ESD) phenomenon occurs, which greatly affects the quality of the products. As the resolution of the display panel increases, there is more and more circuit integration, the width of the metal interconnection becomes less and less, and it is easily affected by ESD.

At present, a common panel structure includes, in addition to the indium tin oxide (ITO) layer and the array substrate side conductive metal traces, three main types of materials: sealant, $SiN_x$, and organic planarization layer (polymer film on array, PFA). In order to improve the breakdown characteristics of organic polymers, polymers and inorganic filler composites are often used; for example, high-dielectric ceramic particles (such as barium titanate, and lead titanate) or conductive particles are filled in the polymer.

However, the difference in dielectric constant between the polymer matrix and the filler particles generally results in non-uniformity of the electric field inside the composite. The uneven mixing of the polymer matrix and the filler particles causes the structure of the composite to be non-uniform, resulting in a significant reduction in the effective breakdown field strength.

SUMMARY OF THE INVENTION

The invention provides a PFA material and a preparation method thereof, which can simultaneously ensure dispersibility and electric field uniformity to solve the technical problem that the current PFA material has a large reduction in the effective breakdown field strength due to structural unevenness and electric field unevenness.

In order to solve the above problems, the technical solution provided by the present invention is as follows:

The present invention provides a PFA material, including: a polymer film on array (PFA) resin, a polysiloxane resin dispersion liquid, and a solvent, wherein the PFA resin ranges between 1 and 25% by weight relative to a total weight of the PFA material, and the polysiloxane resin dispersion liquid ranges between 1 and 30% by weight relative to a total weight of the PFA material.

In some embodiments of the invention, the polysiloxane resin dispersion liquid includes a polysiloxane and an acrylic resin.

In some embodiments of the invention, the polysiloxane ranges between 1 and 30% by weight relative to a total weight of the polysiloxane resin dispersion liquid, and the acrylic resin ranges between 1 and 10% by weight relative to a total weight of the polysiloxane resin dispersion liquid.

In some embodiments of the invention, the PFA material further includes a thermally conductive insulating agent.

In some embodiments of the invention, the thermally conductive insulating agent includes at least one of aluminum nitride, beryllium nitride, aluminum oxide, silicon nitride, aluminum oxide, and boron nitride.

In some embodiments of the invention, the thermally conductive insulating agent is a boron nitride nanoparticle dispersion liquid.

In some embodiments of the invention, the boron nitride nanoparticle dispersion liquid ranges between 0.1 and 10% by weight relative to a total weight of the PFA material.

In some embodiments of the invention, the boron nitride nanoparticle dispersion liquid includes an acrylic resin and boron nitride nanoparticles.

In some embodiments of the invention, the acrylic resin ranges between 1 and 10% by weight relative to a total weight of the boron nitride nanoparticle dispersion liquid, and the boron nitride nanoparticle ranges between 0.1 and 40% by weight relative to a total weight of the boron nitride nanoparticle dispersion liquid.

In some embodiments of the invention, the PFA material further includes an additive including an adhesion aid and a leveling agent.

In some embodiments of the invention, the additive ranges between 0.01 and 5% by weight relative a total weight of the PFA material.

In some embodiments of the invention, when the PFA material is a positive photoresist material, the PFA material further includes a first photoinitiator.

In some embodiments of the invention, when the PFA material is a negative photoresist material, the PFA material further includes an unsaturated polyfunctional monomer and a second photoinitiator.

According to the above object of the present invention, the present invention also provides a method for preparing a PFA material, including: Step 1, preparing a polysiloxane resin dispersion liquid; Step 2, preparing a boron nitride nanoparticle dispersion liquid; Step 3, adding the polysiloxane resin dispersion liquid and the boron nitride nanoparticle dispersion liquid to a PFA resin to prepare a modified PFA material; and Step 4: coating the modified PFA material to form a film, and performing a lithography process, a developing process, and a high-temperature baking process to the film to obtain the PFA material.

In some embodiments of the invention, the step 3 further includes: adding a first photoinitiator to the PFA resin when the PFA material is a positive photoresist material.

In some embodiments of the invention, the step 3 further includes: adding an unsaturated polyfunctional monomer and a second photoinitiator to the PFA resin when the PFA material is a negative photoresist material.

In some embodiments of the invention, the polysiloxane resin dispersion liquid includes polysiloxanes and an acrylic resin.

In some embodiments of the invention, the polysiloxane ranges between 1 and 30% by weight relative to a total weight of the polysiloxane resin dispersion liquid, and the acrylic resin ranges between 1 and 10% by weight relative to a total weight of the polysiloxane resin dispersion liquid.

In some embodiments of the invention, the boron nitride nanoparticle dispersion liquid includes an acrylic resin and a boron nitride nanoparticle.

In some embodiments of the invention, the acrylic resin ranges between 1 and 10% by weight relative to a total weight of the boron nitride nanoparticle dispersion liquid, and the boron nitride nanoparticle ranges between 0.1 and 40% by weight relative to a total weight of the boron nitride nanoparticle dispersion liquid.

Compared with the current PFA materials and preparation methods thereof, the PFA material of the present invention and the preparation method thereof adopts a polysiloxane as a main filler of the PFA resin. Since the polysiloxane and the PFA resin are both organic, the problem of poor dispersibility in the prior art is solved. Further, the final product formed by condensation of the polysiloxane after high-temperature baking is a silicon oxycarbon polymer, which has a dielectric constant (3-5) close to that of the PFA resin, and it ensures the electric field uniformity of the newly prepared PFA material. Moreover, since the boron nitride nanoparticles added in the PFA material are high thermal conductive and non-conductive materials, the thermal conductivity of the PFA material is enhanced, and the heat generated by the surface discharge can be reduced at the discharge site, thereby improving the ESD breakdown resistance of the PFA material.

BRIEF DESCRIPTION OF THE SEVERAL VIEWS OF THE DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

DETAILED DESCRIPTION OF PREFERRED SPECIFIC EMBODIMENTS OF THE INVENTION

Figures 1, 2:
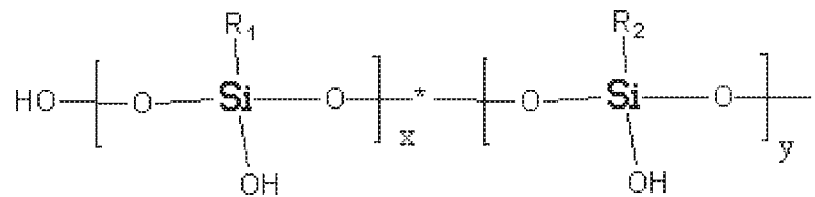
FIG. 1 is a general formula of a polysiloxane provided in an embodiment of the present invention.
FIG. 2 is a compositional diagram of one embodiment of a PFA material provided in an embodiment of the present invention.

The following description of the various embodiments is provided to illustrate the specific embodiments of the invention. Directional terminology mentioned in the present invention, such as "upper", "lower", "front", "behind", "left", "right", "inside", "outside", "side", etc., are merely directions of the drawings. Therefore, the directional terminology used is for the purpose of illustration and understanding of the invention. In the drawings, structurally similar elements are denoted by the same reference numerals.

The invention provides a PFA material and a preparation method thereof, which can simultaneously ensure dispersibility and electric field uniformity to solve the technical problem that the current PFA material has a large reduction in the effective breakdown field strength due to structural unevenness and electric field unevenness.

A polymer film on array (PFA) material provided by an embodiment of the invention includes a polymer film on array (PFA) resin, a polysiloxane resin dispersion liquid, and a solvent. Specifically, the content of each component of the PFA material is:

The total weight of the PFA material is 100% by weight; the content of the polysiloxane resin dispersion liquid is preferably 1-30% by weight, more preferably 1-20% by weight; the content of the PFA resin is preferably 1-25% by weight; and the remainder is a solvent.

In the embodiment of the present invention, the PFA material is selected from the PFA resin, that is, a perfluoroalkoxy resin, and the main filler is selected from the polysiloxane. The polysiloxane is a polymer which has a repeating Si—O bond as its main chain, and an organic group is directly bonded to the silicon atom. As shown in FIG. 1, wherein the organic group is denoted by $R_1$ and $R_2$, and $R_1$ and $R_2$ can be any of an alkyl group, an alkenyl group, an aryl group, a cycloalkyl group, an alkoxy group, an alkylene oxide group, an alkylsilyl group, and an alkylamino group. Both the perfluoroalkoxy resin and the polysiloxane are organic, and the problem of poor dispersibility in the prior art can be solved.

In the embodiment of the present invention, the solvent can be selected from the common solvent of PFA. Specifically, the solvent is preferably, but not limited to, organic ketones, ethers and aromatic hydrocarbons, such as one or more of methyl ethyl ketone (MEK), 2-heptanone (MAK), cyclohexanone, cyclopentanone, butyl phenyl ether, 4-methyl anisole, and cyclohexyl benzene.

Specifically, the polysiloxane resin dispersion liquid may include a polysiloxane, an acrylic resin, and a solvent, wherein a composition content of each component of the polysiloxane resin dispersion liquid can be:

The total weight of the polysiloxane resin dispersion liquid is 100% by weight; the content of the acrylic resin is preferably 1-10% by weight, more preferably 1-5% by weight; and the content of the polysiloxane is preferably 1-30% by weight, more preferably 5-25% by weight; and the remainder is a solvent.

Of course, in the embodiments of the present invention, the PFA material may also be optimized by adding adjuvants and additives. Thus, based on the above embodiments, in another embodiment of the present invention, the PFA material may include: a PFA resin, a polysiloxane resin dispersion liquid, an adjuvant, an additive, and a solvent.

In the embodiment of the present invention, an adjuvant and an additive are newly added, wherein the adjuvant may be a thermal conductive insulating agent. The thermal conductive insulating agent may include one or more of aluminum nitride, tantalum nitride, aluminum oxide, silicon nitride, aluminum oxide, and boron nitride. The thermal conductive insulating agent can improve the thermal conductivity of the PFA material and reduce the heat generated by the surface discharge to accumulate at the discharge site, thereby improving the ESD breakdown resistance of the PFA material. It is to be understood that in other embodiments of the present invention, other materials besides the thermal conductive insulating agent may be selected as the adjuvant, which is not limited herein.

Preferably, a boron nitride nanoparticle dispersion liquid can be selected in the embodiment of the present invention. In some embodiments of the invention, the additives may include an adhesion aid and a leveling agent, the adhesion aid is used to increase the adhesion of the coating film to the substrate, and the leveling agent is used to reduce the surface tension of the coating film and improve its leveling and uniformity.

Specifically, the boron nitride nanoparticle dispersion liquid may include an acrylic resin, boron nitride nanoparticles, and a solvent, wherein, the composition content of each component of the boron nitride nanoparticle dispersion liquid may be:

The total weight of the boron nitride nanoparticle dispersion is 100% by weight; the content of the acrylic resin is preferably 1-10% by weight, more preferably 1-5% by weight; the content of the boron nitride nanoparticles is preferably 0.1-40% by weight, more preferably 0.1-30% by weight; and the remainder is a solvent.

Based on the above embodiments, in another embodiment of the present invention, the provided PFA material is a positive photoresist material. As shown in FIG. 2, the PFA material may include a PFA resin, a polysiloxane resin dispersion liquid, a thermal conductive insulating agent, a first photoinitiator, an additive, and a solvent. Specifically, the composition content of each component of the PFA material may be:

The total weight of the PFA material is 100% by weight, the content of the polysiloxane resin dispersion liquid is preferably 1-30% by weight, more preferably 1-20% by weight; the content of the PFA resin is preferably 1-25% by weight; the content of the boron nitride nanoparticle dispersion liquid is preferably 0.1-10% by weight, more preferably 0.1-5% by weight; the content of the first photoinitiator is preferably 0.05-10% by weight, and the content of the additive is preferably 0.01-5% by weight; and the remainder is a solvent.

Based on the above embodiments, in another embodiment of the present invention, the provided PFA material is a negative photoresist material. The PFA material may include a PFA resin, a polysiloxane resin dispersion liquid, a thermally conductive insulating agent, an unsaturated polyfunctional monomer, a second photoinitiator, an additive, and a solvent. Specifically, the composition content of each component of the PFA material can be:

The total weight of the PFA material is 100% by weight, and the content of the polysiloxane resin dispersion liquid is preferably 1-30% by weight, more preferably 1-20% by weight; the content of the PFA resin is preferably 1-25% by weight; and the content of the boron nitride nanoparticle dispersion liquid is preferably 0.1-10% by weight, more preferably 0.1-5% by weight; the content of the unsaturated polyfunctional monomer is preferably 1-20% by weight; the content of the second photoinitiator is preferably 0.05-8% by weight; the content of the additive is preferably 0.01-5% by weight; the remainder is a solvent.

Figure 3:
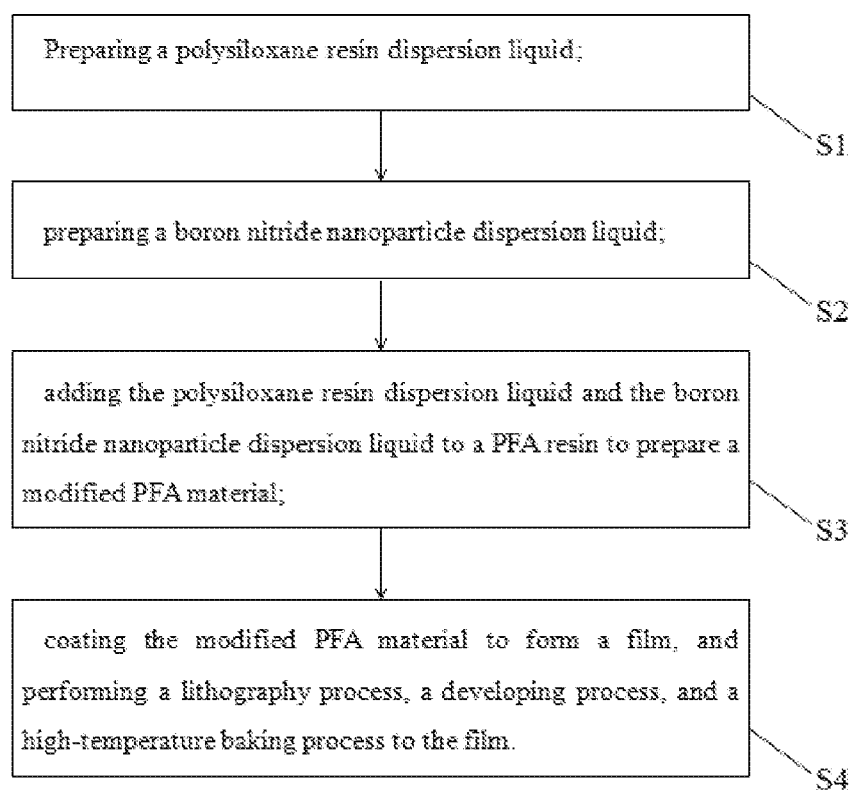
FIG. 3 is a flow chart of one embodiment of a method of preparing a PFA material provided in an embodiment of the present invention.

According to the above objects of the present invention, an embodiment of a method for preparing a PFA material described in the above embodiment, as shown in FIG. 3, further includes:

S1, preparing a polysiloxane resin dispersion liquid; wherein the polysiloxane resin dispersion liquid may include a polysiloxane, an acrylic resin, and a solvent. In the embodiment of the present invention, when the polysiloxane resin dispersion liquid includes a plurality of components, the polysiloxane resin dispersion liquid can be prepared in a predetermined ratio.

In a specific embodiment, when the polysiloxane resin dispersion liquid includes a plurality of components, the predetermined ratio of each component of the polysiloxane resin dispersion liquid can be:

The total weight of the polysiloxane resin dispersion liquid is 100% by weight, and the content of the acrylic resin is preferably 1-10% by weight, more preferably 1-5% by weight; the content of the polysiloxane is preferably 1-30% by weight, more preferably 5-25% by weight, the remainder is a solvent.

S2, preparing a boron nitride nanoparticle dispersion liquid; wherein the boron nitride nanoparticle dispersion liquid can include an acrylic resin, boron nitride nanoparticles, and a solvent. In the embodiment of the present invention, when the boron nitride nanoparticle dispersion liquid includes a plurality of components, the boron nitride nanoparticle dispersion liquid can be prepared in a predetermined ratio.

In a specific embodiment, when the boron nitride nanoparticle dispersion liquid includes a plurality of components, the predetermined ratio of each component of the boron nitride nanoparticle dispersion liquid can be:

The total weight of the boron nitride nanoparticle dispersion liquid is 100% by weight, the content of the acrylic resin is preferably 1-10% by weight, more preferably 1-5% by weight, and the content of the boron nitride nanoparticles is preferably 0.1-40% by weight, more preferably 0.1-30% by weight; the remainder is a solvent.

S3, adding the polysiloxane resin dispersion liquid and the boron nitride nanoparticle dispersion liquid to a PFA resin to prepare a modified PFA material.

Based on the above embodiments, in another embodiment of the present invention, the provided PFA material is a positive photoresist material. As shown in FIG. 2, the PFA material can include a PFA resin, polysiloxane resin dispersion liquid, a thermally conductive insulating agent, a first photoinitiator, an additive, and a solvent. Specifically, the composition content of each component of the PFA material can be:

The total weight of the PFA material is 100% by weight, and the content of the polysiloxane resin dispersion liquid is preferably 1-30% by weight, more preferably 1-20% by weight; the content of the PFA resin is preferably 1-25% by weight; the content of the boron nitride nanoparticle dispersion liquid is preferably 0.1-10% by weight, more preferably 0.1-5% by weight; the content of the first photoinitiator is preferably 0.05-10% by weight; the content of the additive is preferably 0.01-5% by weight, and the remainder is a solvent.

Based on the above embodiments, in another embodiment of the present invention, the provided PFA material is a negative photoresist material. The PFA material can include a PFA resin, polysiloxane resin dispersion liquid, a thermally conductive insulating agent, an unsaturated polyfunctional monomer, a second photoinitiator, an additive, and a solvent. Specifically, the composition content of each component of the PFA material can be:

The total weight of the PFA material is 100% by weight, and the content of the polysiloxane resin dispersion liquid is preferably 1-30% by weight, more preferably 1-20% by weight; the content of the boron nitride nanoparticle dispersion liquid is preferably 0.1-10% by weight, more preferably 0.1-5% by weight; the content of the PFA resin is preferably 1-25% by weight; the content of the boron nitride nanoparticle dispersion liquid is preferably 0.1-10% by weight, more preferably 0.1-5% by weight; the content of the unsaturated polyfunctional monomer is preferably 1-20% by weight; the content of the second photoinitiator is preferably 0.05-8% by weight; the content of the additive is preferably 0.01-5% by weight; and the remainder is a solvent.

S4, coating the modified PFA material to form a film and performing a lithography process, a developing process, and a high-temperature baking process to the film to obtain the PFA material; wherein the film formation by coating, lithography, developing, and high-temperature baking processes are prior art and are not specifically limited herein.

In this embodiment, the order of step S1 and step S2 can be interchanged without strict restrictions. After the PFA material is subjected to a PFA process, the polysiloxane is condensed to form a silicon oxycarbon porous polymer structure. The boron nitride nanoparticles as the thermally conductive insulating agent are completely dispersed in the lattice structure formed by the silicon oxycarbon porous polymer and the PFA resin.

The beneficial effects of the present invention are:

Compared with the current PFA materials and preparation methods thereof, the PFA material of the present invention and the preparation method thereof adopts polysiloxanes as a main filler of the PFA resin. Since the polysiloxane and the PFA resin are both organic, the problem of poor dispersibility in the prior art is solved. Further, the final product formed by condensation of the polysiloxane after high-temperature baking is a silicon oxycarbon polymer, which has a dielectric constant (3-5) close to the PFA resin, and it ensures the electric field uniformity of the newly prepared PFA material. Moreover, since the boron nitride nanoparticles added in the PFA material have high thermal conductivity and are non-conductive materials, the thermal conductivity of the PFA material is enhanced, and the heat generated by the surface discharge can be reduced at the discharge site, thereby improving the ESD breakdown resistance of the PFA material.

The description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A polymer film on array (PFA) material, comprising:
a polymer film on array (PFA) resin, a polysiloxane resin dispersion liquid comprising polysiloxane and an acrylic resin, and a solvent, wherein the PFA resin ranges from 1 to 25% by weight relative to a total weight of the PFA material, and the polysiloxane resin dispersion liquid ranges from 1 to 30% by weight relative to the total weight of the PFA material.

2. The PFA material according to claim 1, wherein the polysiloxane ranges from 1 to 30% by weight relative to a total weight of the polysiloxane resin dispersion liquid, and the acrylic resin ranges from 1 to 10% by weight relative to the total weight of the polysiloxane resin dispersion liquid.

3. The PFA material according to claim 1, wherein the PFA material further comprises a thermally conductive insulating agent.

4. The PFA material according to claim 3, wherein the thermally conductive insulating agent comprises at least one of aluminum nitride, beryllium nitride, aluminum oxide, silicon nitride, aluminum oxide, and boron nitride.

5. The PFA material according to claim 3, wherein the thermally conductive insulating agent is a boron nitride nanoparticle dispersion liquid.

6. The PFA material according to claim 5, wherein the boron nitride nanoparticle dispersion liquid ranges from 0.1 to 10% by weight relative to the total weight of the PFA material.

7. The PFA material according to claim 5, wherein the boron nitride nanoparticle dispersion liquid comprises an acrylic resin and boron nitride nanoparticles.

8. The PFA material according to claim 7, wherein the acrylic resin ranges from 1 to 10% by weight relative to a total weight of the boron nitride nanoparticle dispersion liquid, and the boron nitride nanoparticle ranges from 0.1 to 40% by weight relative to the total weight of the boron nitride nanoparticle dispersion liquid.

9. The PFA material according to claim 1, wherein the PFA material further comprises an additive comprising an adhesion aid and a leveling agent.

10. The PFA material according to claim 9, wherein the additive ranges from 0.01 to 5% by weight relative to the total weight of the PFA material.

11. The PFA material according to claim 1, wherein when the PFA material is a positive photoresist material, the PFA material further comprises a photoinitiator.

12. The PFA material according to claim 1, wherein when the PFA material is a negative photoresist material, the PFA material further comprises an unsaturated polyfunctional monomer and a photoinitiator.

* * * * *